United States Patent
Manuilov et al.

(10) Patent No.: US 10,318,272 B1
(45) Date of Patent: Jun. 11, 2019

(54) SYSTEMS AND METHODS FOR MANAGING APPLICATION UPDATES

(71) Applicant: Symantec Corporation, Mountain View, CA (US)

(72) Inventors: Konstantin Manuilov, Tallinn (EE); Tatjana Fedotova, Tallinn (EE)

(73) Assignee: Symantec Corporation, Mountain View, CA (US)

( * ) Notice: Subject to any disclaimer, the term of this patent is extended or adjusted under 35 U.S.C. 154(b) by 58 days.

(21) Appl. No.: 15/474,067

(22) Filed: Mar. 30, 2017

(51) Int. Cl.
  *G06F 9/44* (2018.01)
  *G06F 8/65* (2018.01)
  *H04L 29/08* (2006.01)

(52) U.S. Cl.
  CPC .............. *G06F 8/65* (2013.01); *H04L 67/22* (2013.01); *H04L 67/34* (2013.01)

(58) Field of Classification Search
  CPC ....................................................... G06F 9/44
  USPC ................................................. 717/170–178
  See application file for complete search history.

(56) References Cited

U.S. PATENT DOCUMENTS

| | | | | |
|---|---|---|---|---|
| 7,231,410 B1* | 6/2007 | Walsh | ......................... | G06F 8/71 |
| 7,853,719 B1* | 12/2010 | Cao | .................... | G06F 17/30887 |
| | | | | 709/203 |
| 8,321,858 B1* | 11/2012 | Marmaros | .................. | G06F 8/65 |
| | | | | 717/173 |
| 8,819,823 B1* | 8/2014 | Banerjee | ............. | H04L 63/1441 |
| | | | | 719/311 |
| 9,665,656 B2* | 5/2017 | Lui | ....................... | G06F 17/3089 |
| 9,800,590 B1* | 10/2017 | Gates | ................... | H04L 63/1408 |
| 2009/0100422 A1* | 4/2009 | Abe | ........................... | G06F 8/61 |
| | | | | 717/174 |
| 2010/0245909 A1* | 9/2010 | Yamaguchi | ........... | G06F 3/1204 |
| | | | | 358/1.15 |
| 2012/0185516 A1* | 7/2012 | Xu | ..................... | G06F 17/30115 |
| | | | | 707/803 |
| 2015/0096019 A1* | 4/2015 | Davis | .................. | H04L 63/1408 |
| | | | | 726/23 |
| 2015/0199190 A1* | 7/2015 | Spangler | ................. | G06F 8/654 |
| | | | | 713/2 |
| 2017/0111368 A1* | 4/2017 | Hibbert | ................. | H04L 63/062 |
| 2017/0115978 A1* | 4/2017 | Modi | ......................... | G06F 8/65 |
| 2018/0004940 A1* | 1/2018 | Ha | ...................... | H04L 63/1425 |

* cited by examiner

*Primary Examiner* — Jae U Jeon
(74) *Attorney, Agent, or Firm* — FisherBroyles, LLP

(57) ABSTRACT

The disclosed computer-implemented method for managing application updates may include (i) recording network activity of a target application, (ii) recording an identifying attribute of the target application that is associated with a current version of the target application, (iii) determining, based on recording the identifying attribute, that the target application has attempted to update from a previous version of the target application to the current version of the target application, (iv) locating a portion of network activity that reveals how to manually update an instance of the previous version of the target application, and (v) perform, in response to locating the portion of network activity that reveals how to manually update the instance of the previous version of the target application, a security action to protect a user from a candidate security threat. Various other methods, systems, and computer-readable media are also disclosed.

20 Claims, 6 Drawing Sheets

SYSTEMS AND METHODS FOR MANAGING APPLICATION UPDATES

BACKGROUND

Many consumer-oriented applications have an auto-update option. In enterprise scenarios, however, an administrator often wishes to lock down the version of an application used in the enterprise environment. Accordingly, the administrator often disables the auto-update option for applications. Instead, the administrator may prefer to distribute applications through an alternative mechanism that is controlled by the administrator.

Unfortunately, there is no standard and universal way to learn whether a new version of an application is available. The inability to detect when an application is available, in a standard and universal way, can prevent an administrator from applying the latest (and preferred) version of an application once it is released. In some cases, information about newly available versions of applications can be obtained through an application programming interface, a RICH SITE SUMMARY feed, and/or blogs. Nevertheless, even in these cases, the mechanism for releasing the information about newly available versions of applications is generally vendor-specific. Accordingly, an administrator of an enterprise computing network will generally be unable to apply the same technique for detecting newly available versions of applications across applications from different vendors. The instant disclosure, therefore, identifies and addresses a need for systems and methods for managing application updates.

SUMMARY

As will be described in greater detail below, the instant disclosure describes various systems and methods for managing application updates. In one example, a computer-implemented method for managing application updates may include (i) recording network activity of a target application, (ii) recording an identifying attribute of the target application that is associated with a current version of the target application, (iii) determining, based on recording the identifying attribute that is associated with the current version, that the application has attempted to update from a previous version of the target application to the current version of the target application, (iv) locating, within the recorded network activity, and in response to determining that the application has attempted to update from the previous version of the target application to the current version, a portion of network activity that reveals how to manually update an instance of the previous version of the target application, and (v) performing, in response to locating the portion of network activity that reveals how to manually update the instance of the previous version of the target application, a security action to protect a user from a candidate security threat.

In one embodiment, the computer-implemented method may further include manually updating, after performing the security action, the instance of the previous version of the target application based on the portion of network activity that reveals how to manually update the instance rather than automatically updating the instance of the previous version of the target application through an auto-update function of the instance of the previous version of the target application. In one embodiment, the portion of the network activity reveals a uniform resource locator where a download for updating the target application is available.

In one embodiment, the uniform resource locator dynamically changes between versions of the target application and the portion of network activity reveals how to dynamically generate the uniform resource locator for the current version of the target application. In one embodiment, the uniform resource locator dynamically changes between versions of the target application based on a file version of the current version of the target application and/or a date of releasing the target application.

In one embodiment, the identifying attribute that is associated with the current version may include a file version number. In one embodiment, the identifying attribute that is associated with the current version may include a hash of the current version of the target application.

In one embodiment, determining that the application has attempted to update from the previous version of the target application to the current version of the target application includes determining that the identifying attribute has changed from a previous version of the identifying attribute. In one embodiment, locating, within the recorded network activity, the portion of network activity may include matching the network activity, within a span of time, to the recording of the identifying attribute. In one embodiment, the security action may include disabling an auto-update function of the instance of the previous version of the target application.

In one embodiment, a system for implementing the above-described method may include (i) a recording module, stored in memory, that records (a) network activity of a target application, and (b) an identifying attribute of the target application that is associated with a current version of the target application, (ii) a determination module, stored in memory, that determines, based on recording the identifying attribute that is associated with the current version, that the application has attempted to update from a previous version of the target application to the current version of the target application, (iii) a location module, stored in memory, that locates, within the recorded network activity, and in response to determining that the application has attempted to update from the previous version of the target application to the current version, a portion of network activity that reveals how to manually update an instance of the previous version of the target application, (iv) a performance module, stored in memory, that performs, in response to locating the portion of network activity that reveals how to manually update the instance of the previous version of the target application, a security action to protect a user from a candidate security threat, and (v) at least one physical processor configured to execute the recording module, the determination module, the location module, and the performance module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) record network activity of a target application, (ii) record an identifying attribute of the target application that is associated with a current version of the target application, (iii) determine, based on recording the identifying attribute that is associated with the current version, that the application has attempted to update from a previous version of the target application to the current version of the target application, (iv) locate, within the recorded network activity, and in response to determining that the application has attempted to update from the previous version of the target application to the current version, a portion of network activity that reveals how to manually update an instance of the previous version of the target application, and (v) perform, in response to locating the portion of network activity that reveals how to manually update the instance of the previous version of the target application, a security action to protect a user from a candidate security threat.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
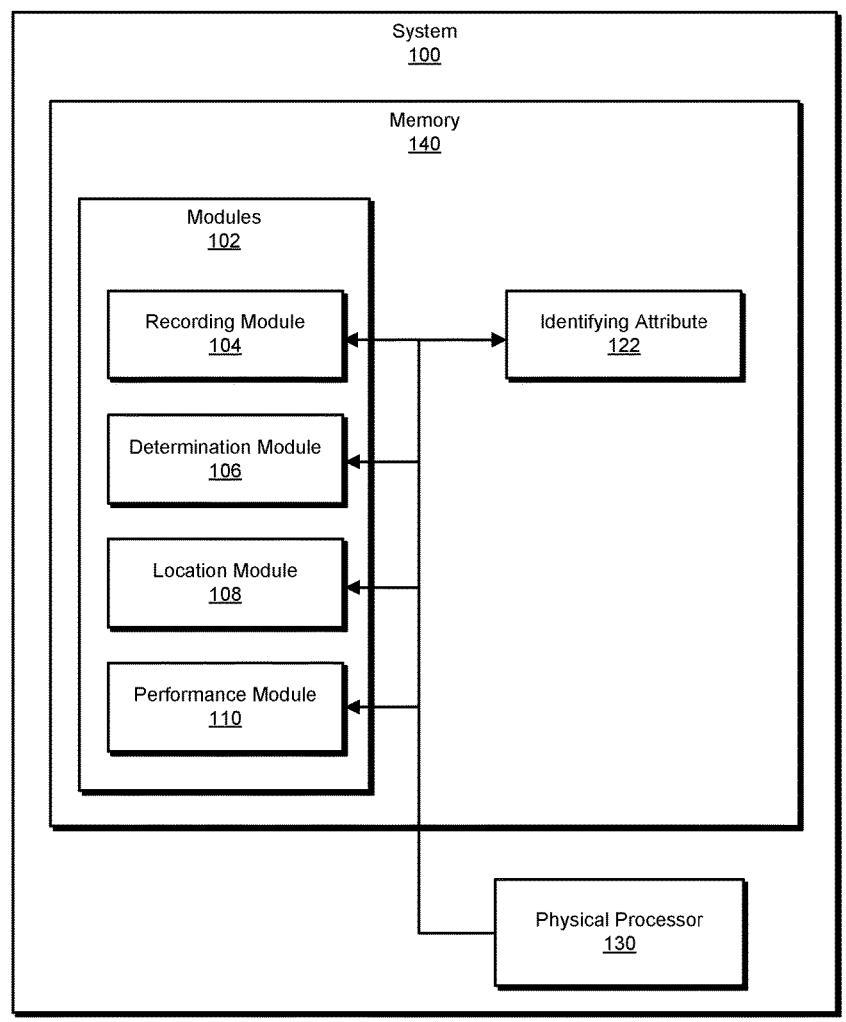
FIG. 1 is a block diagram of an example system for managing application updates.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for managing application updates. In some examples, the disclosed systems and methods may enable an administrator of an enterprise network environment to reliably, and more conveniently, ascertain information revealing how to manually update a target application, as discussed further below. In general, this technique may be application-agnostic, in the sense that the technique may reliably ascertain this information for a substantial number, majority, or strong majority of applications in the enterprise network environment, even when these applications correspond to various different vendors. Accordingly, the administrator and/or corresponding endpoint security system may take control of the decision of when to apply a newly-discovered update to one or more additional instances of the application. Additionally, the administrator and/or corresponding endpoint security system may disable the auto-update function on these additional instances of the application, thereby enabling the administrator and/or system to apply the update at a later time (e.g., after the administrator has performed one or more tests or verifications regarding the security of the update). In this manner, the administrator may effectively synchronize the updating of one or more applications across an entire enterprise network. Furthermore, the administrator may switch control of the updating procedure from the application, and its auto-update function, back to the administrator, who may apply one or more updates at a time of the administrator's choosing. Notably, in some examples, the endpoint security system, such as system 100 and system 200 discussed below, may additionally or alternatively perform these functions of the administrator.

Figure 2:
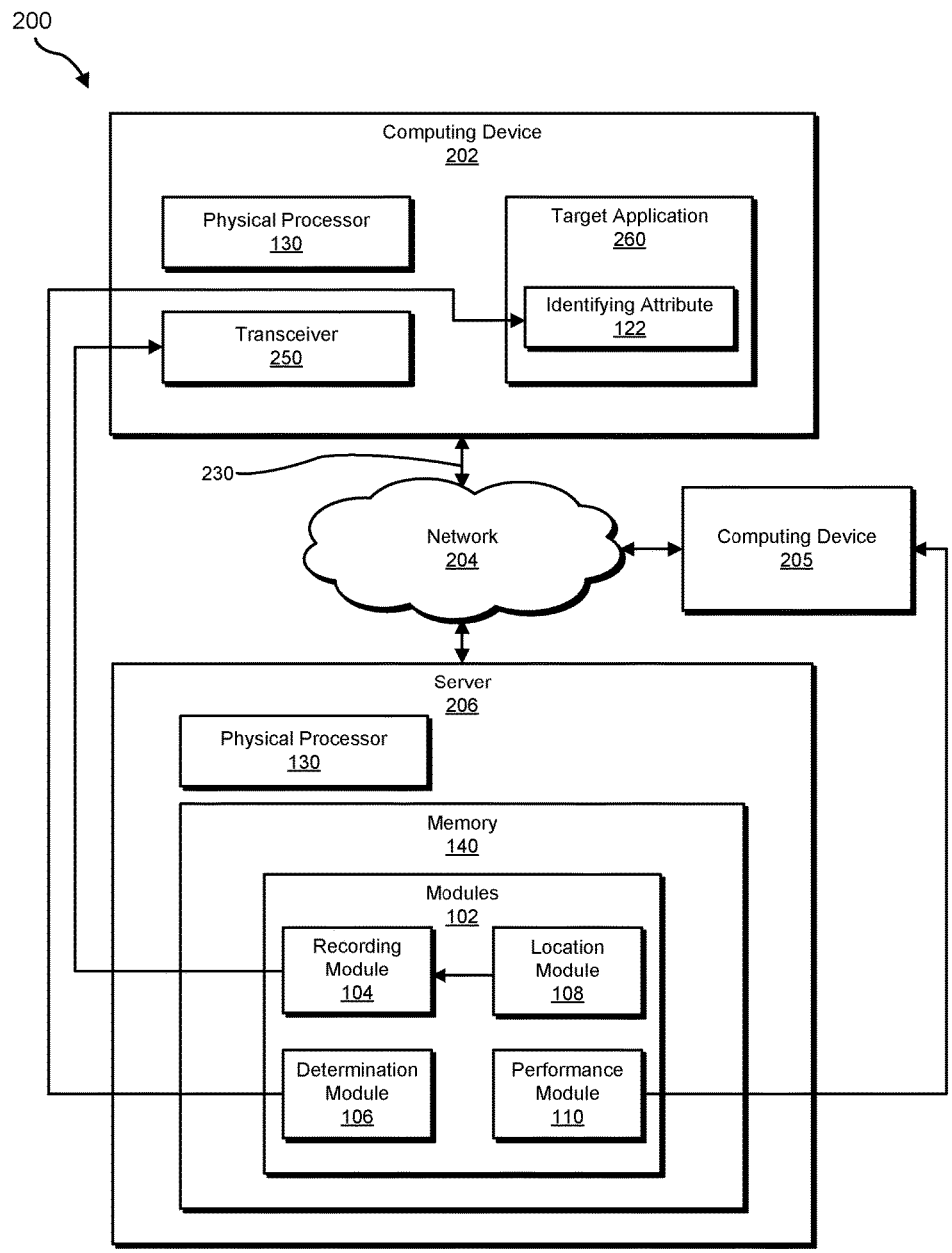
FIG. 2 is a block diagram of an additional example system for managing application updates.

The following will provide, with reference to FIGS. 1-2, detailed descriptions of example systems for managing application updates. Detailed descriptions of corresponding computer-implemented methods will also be provided in connection with FIGS. 3-4. In addition, detailed descriptions of an example computing system and network architecture capable of implementing one or more of the embodiments described herein will be provided in connection with FIGS. 5 and 6, respectively.

FIG. 1 is a block diagram of example system 100 for managing application updates. As illustrated in this figure, example system 100 may include one or more modules 102 for performing one or more tasks. For example, and as will be explained in greater detail below, example system 100 may include a recording module 104 that records network activity of a target application. Recording module 104 may additionally record an identifying attribute of the target application that is associated with a current version of the target application. Example system 100 may additionally include a determination module 106 that determines, based on recording the identifying attribute that is associated with the current version, that the application has attempted to update from a previous version of the target application to the current version of the target application. Example system 100 may also include a location module 108 that locates, within the recorded network activity, and in response to determining that the application has attempted to update from the previous version of the target application to the current version, a portion of network activity that reveals how to manually update an instance of the previous version of the target application. Furthermore, example system 100 may additionally include a performance module 110 that performs, in response to locating the portion of network activity that reveals how to manually update the instance of the previous version of the target application, a security action to protect a user from a candidate security threat. Although illustrated as separate elements, one or more of modules 102 in FIG. 1 may represent portions of a single module or application. Notably, as shown in FIG. 1, memory 140 of system 100 may further store an identifying attribute 122, as discussed further below in connection with FIG. 2.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate managing application updates. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system (according to any suitable permutation of one or more modules across these devices). As will be described in greater detail below, one or more of modules 102 from FIG. 1 may, when executed by at least one processor of computing device 202 and/or server 206, enable computing device 202 and/or server 206 to manage application updates.

For example, and as will be described in greater detail below, one or more of modules 102 may cause computing device 202 and/or server 206 to manage application updates. For example, and as will be described in greater detail below, recording module 104 may record network activity of a target application 260. Recording module 104 may record identifying attribute 122 of target application 260 that is associated with a current version of target application 260. Determination module 106 may determine, based on recording identifying attribute 122 that is associated with the current version, that target application 260 has attempted to update from a previous version of target application 260 to the current version of target application 260. Location module 108 may locate, within the recorded network activity, and in response to determining that target application 260 has attempted to update from the previous version of target application 260 to the current version, a portion 230 of network activity that reveals how to manually update an instance of the previous version of the target application. Performance module 110 may perform, in response to locating portion 230 of network activity that reveals how to manually update the instance of the previous version of target application 260, a security action to protect a user from a candidate security threat. Notably, in some examples, computing device 202 may further include a transceiver 250 that may communicate with network 204, and through which the network activity of target application 260 may be recorded by recording module 104, as shown in FIG. 2.

Computing device 202 generally represents any type or form of computing device capable of reading computer-executable instructions. In some examples, computing device 202 may correspond to a client device of enterprise network environment, which may be monitored by recording module 104 at server 206, as discussed further below. Furthermore, computing device 205 may parallel the configuration of computing device 202, and computing device 205 may contain another instance of a previous version of target application 260. Performance module 110 may disable the auto-update function of the instance of the previous version of target application 260 at computing device 205, as discussed further below. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Server 206 generally represents any type or form of computing device that is capable of performing, or facilitating, method 300, as described further below. In general, server 206 may correspond to a centralized or security server of an enterprise network environment. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another. Notably, in some examples, one or more of modules 102, and/or computing device 202 and server 206, may be combined into a single device, or otherwise rearranged according to any suitable permutation that successfully performs method 300, as discussed further below.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
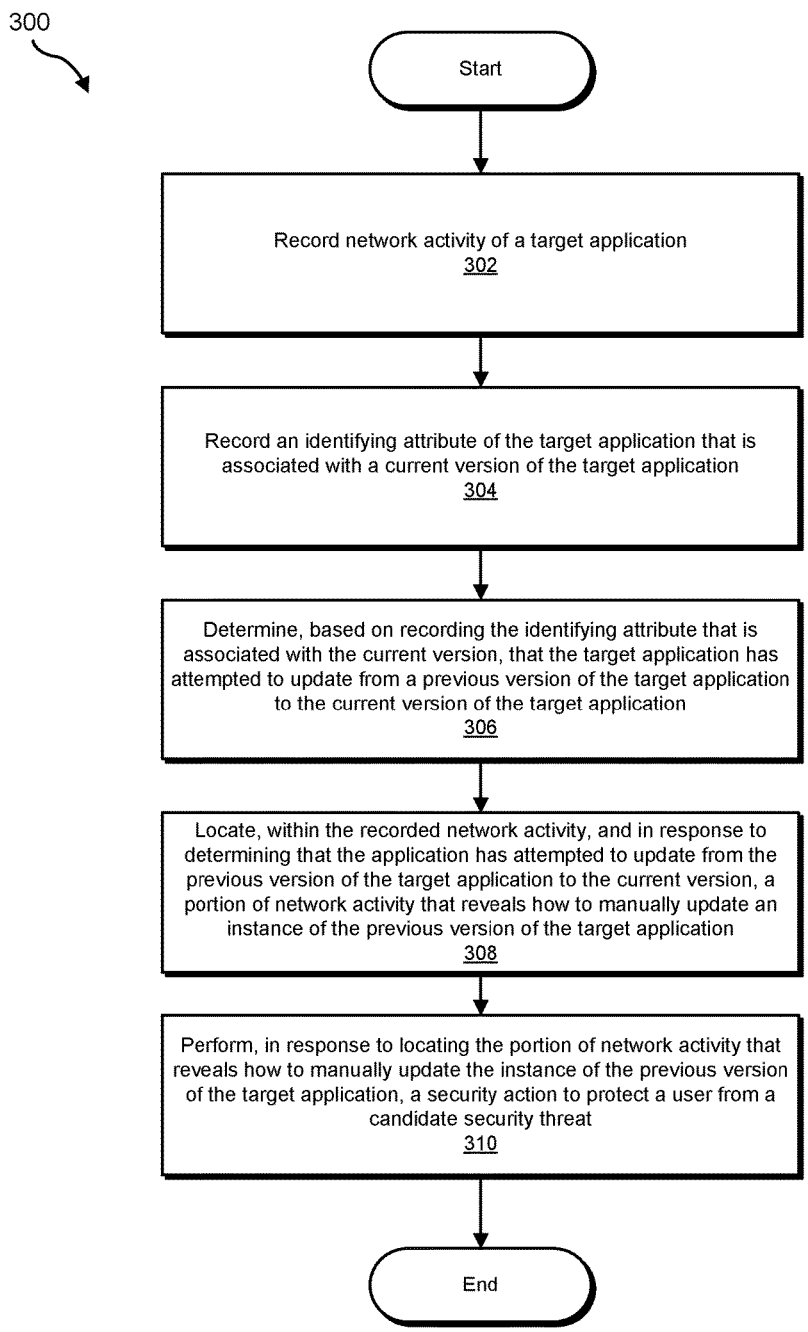
FIG. 3 is a flow diagram of an example method for managing application updates.

FIG. 3 is a flow diagram of an example computer-implemented method 300 for managing application updates. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may record network activity of a target application. For example, recording module 104 may, as part of server 206 in FIG. 2, record network activity of target application 260.

As used herein, the term "target application" generally refers to an application that is the target of a security system monitoring procedure, such as the procedure of method 300, as discussed further below. Recording module 104 may record the network activity in a variety of ways. In general, recording module 104 may record, or intercept, one or more network packets that are transmitted, and/or received, by the target application. In some examples, recording module 104 may hook into a network stack, or network interface, to record the network packets. In further examples, recording module 104 may perform the hooking through a local hooking agent at computing device 202.

In additional examples, recording module 104 may record the network activity by interfacing with an application programming interface of an operating system. The application programming interface may provide an interface to the network stack, or corresponding network packets, that are received/transmitted by the operating system. In some examples, recording module 104 may circumvent network encryption protocols (and/or encryption applied by the target application) by hooking into the network stack or protocol prior to application of the encryption technique. For example, recording module 104 may interface with a network sniffer that is provided by an operating system such as MICROSOFT WINDOWS.

At step 304, one or more of the systems described herein may record an identifying attribute of the target application that is associated with a current version of the target application. For example, recording module 104 may, as part of server 206 in FIG. 2, record identifying attribute 122 of the target application that is associated with a current version of the target application.

As used herein, the term "identifying attribute of the target application that is associated with a current version of the target application" generally refers to any attribute, by itself or in combination with other information, that indicates the current version of the target application. Examples of the identifying attribute may include metadata of the target application, a field of the metadata of the target application, a file version number, a hash of the target application, a registry key or registry key value associated with the target application (i.e., set or modified by the target application), and/or any other suitable identifying attribute. In general, the identifying attribute of the target application may be present in the current version of the target application, but absent in an earlier version of the target application. In other words, a value of a field that corresponds to the identifying attribute may change between versions of the target application, thereby indicating that the target application has been updated, as discussed further below. In some examples, the identifying attribute may correspond to a feature, graphic, and/or code portion that is present in the current version of the target application, but absent from the earlier version of the target application (or vice-versa, or otherwise different between versions of the target application).

Recording module 104 may record an identifying attribute of the target application in a variety of ways. In some examples, recording module 104 may record the identifying attribute within the network activity that is recorded at step 302, as discussed further above. In alternative examples, recording module 104 may record identifying attribute 122 as part of a scan, by an endpoint security system, of the target application at computing device 202. In these examples, the target application may be installed at computing device 202. Recording module 104 may scan the target application at computing device 202 to obtain one or more identifying attributes of the target application. For example, recording module 104 may obtain the hash of the target application (or any digital fingerprint of the target application), the file version number of the target application, the file name of the target application, one or more items of file metadata that correspond to the target application, and/or any other suitable item corresponding to an identifying attribute, as discussed further above. Recording module 104 may perform the scanning procedure routinely or continuously, according to a predefined schedule, for one or more installed applications, and for one or more client computing devices, in an effort to detect when a target application has attempted to update, as discussed further below.

In some examples, recording module 104 may obtain one or more of these items as part of a security scan by the endpoint security system. For example, recording module 104 may scan some, all, or substantially all applications that are available, or installed, at computing device 202 to identify one or more identifying attributes. In this manner, recording module 104 may thereby automatically, or autonomously, obtain identifying attributes and detect when applications have been updated, as indicated by changes in the content, presence, or absence of identifying attributes. Accordingly, recording module 104 may thereby perform step 304 in a batch manner for a multitude of different applications. Upon detecting that one or more applications has been updated, or attempted to be updated, system 100 or system 200 may further perform the remainder of method 300, as discussed further below.

At step 306, one or more of the systems described herein may determine, based on recording the identifying attribute that is associated with the current version, that the target application has attempted to update from a previous version of the target application to the current version of the target application. For example, determination module 106 may, as part of server 206 in FIG. 2, determine, based on recording identifying attribute 122 that is associated with the current version, that target application 260 attempted to update from a previous version of target application 260 to the current version of target application 260.

As used herein, the phrase "has attempted to update" generally refers to successfully or unsuccessfully attempting to update the target application. In various embodiments, determination module 106 may check for whether the target application has successfully attempted to update, unsuccessfully attempted to update, or both. In some examples, an incomplete update process may leave one or more identifying attributes that indicate either the previous version of the target application or the current version of the target application (i.e., the version to which the target application is attempting to update). Accordingly, even in cases of incomplete updating, one or more identifying attributes may indicate the current version of the target application and, therefore, further indicate that the target application attempted to update to that current version.

In general, determination module 106 may determine that the target application attempted to update to the current version in a variety of ways. Determination module 106 may determine that the identifying attribute is associated with the current version of the target application, which was not previously known to have been updated at computing device 202 (e.g., known by server 206 managing the enterprise network environment). Determination module 106 may further identify the presence of an identifying attribute that was absent in a previous version of the target application, identify the absence of an identifying attribute that was present in a previous version of the target application, or otherwise detect a change in the identifying attribute that is indicative of the updating procedure.

In one specific example, determination module 106 may look up the identifying attribute in a lookup table that associates various identifying attributes with corresponding versions of the target application. In these examples, determination module 106 may determine that the identifying attribute is not associated with the previous version of the target application and, therefore, determination module 106 may deduce that the target application has attempted to update to the current version of the target application. In further examples, determination module 106 may determine that the identifying attribute is associated with a version of the target application that is subsequent to the previous version of the target application. In general, determination module 106 may determine that the value of the identifying attribute has changed. For example, the hash of the target application may have changed and/or the file version number may have changed.

At step 308, one or more of the systems described herein may locate, within the recorded network activity, and in response to determining that the target application has attempted to update from the previous version of the target application to the current version, a portion of network activity that reveals how to manually update an instance of the previous version of the target application. For example, location module 108 may, as part of server 206 in FIG. 2, locate, within the recorded network activity, and in response to determining that target application 260 has attempted to update from the previous version of target application 260 to the current version, portion 230 of network activity that reveals how to manually update an instance of the previous version of target application 260. As used herein, the phrase "locate within the recorded network activity" generally refers to searching, querying, and/or scanning logs of previously recorded network activity, or otherwise identifying the portion of network activity within the recorded network activity.

As used herein, the phrase "manually update" generally refers to updating the application through a process that is initiated by a security program and/or administrator outside of an auto-update functionality within the target application. For example, a target application may include an auto-update function that periodically scans a remote server for the availability of a file that would update the target application. The file may include, or correspond to, the current version of the target application itself, a patch file that, when executed, revises or updates the previous version of the target application, a download manager file that, when executed, downloads a patch file and/or the current version of the target application, and/or configuration files or ancillary files that are associated with the target application and, when installed with the target application, effectively update the target application. Upon detecting the presence of such a file, the auto-update function may, with or without prompting an administrator for approval, download and automatically, or autonomously, update the target application. In contrast, the administrator, or a security program, may disable the auto-update functionality, as described further below. Additionally, the administrator or security program may initiate the update of the application by repeating one or more network commands that would have been performed by the auto-update function. Additionally, or alternatively, the administrator or security program may download the file for performing the update of the target application and then execute the file to perform the update, at a time selected by the administrator or security program, rather than a time selected by the auto-update function.

In general, the phrase "manually update" refers to the administrator or outside security program taking control of the timing and/or initiation of the updating of the target application by performing an update procedure, outside of the auto-update function that the target application provides, in a manner that reverse-engineers part, or all, of the auto-update procedure to enable the administrator or security program to perform the updating themselves, at a different time than the auto-update function would select or initiate. The manual update may thereby enable the administrator, or security program, to delay the updating of the target application, to synchronize the updating of multiple instances of the target application, and to verify the security or safety of the update prior to applying the update to the target application, as discussed further below.

Additionally, the phrase "reveals how to manually update an instance of the previous version of the target application" generally refers to information within the recorded network activity that, by itself or in combination with other information, switches a state of the administrator and/or security program (e.g., at server 206, or a local security agent at computing device 202) from not knowing how to manually update the target application, as described above, to a state of knowing how to manually update the target application. In other words, the information, by itself or in combination with other information, enables the administrator or security program to perform the manual update, and the administrator or security program may be unable to perform the manual update without this information. In example embodiments, the information may include a uniform resource locator that indicates where one or more files for updating the target application are located, and from which the files can be downloaded. In other examples, the information may include network commands, including network query and network response packets, that are associated with the auto-update procedure (e.g., which can be repeated manually by the administrator to perform the updating procedure at a timing selected by the administrator). In further examples, the information may include one or more files themselves for updating the target application (e.g., one or more executable files downloaded from the uniform resource locator, as further discussed above).

In general, location module 108 may identify both a timing and/or a location associated with the updating procedure for the target application (e.g., a uniform resource locator where the download is available for updating the target application). In some examples, location module 108 may first identify the timing of the previously performed updating procedure, and then, in response, identify the corresponding location for the download for updating the target application (or vice versa).

Location module 108 may locate the portion of network activity in a variety of ways. In general, location module 108 may attempt to correlate, or match, the recording of the identifying attribute with one or more portions of recorded network activity. For example, location module 108 may attempt to match these two items in time, because they both occur within a predefined length of time from each other, thereby indicating a correlational relationship. Additionally, or alternatively, the identifying attribute itself may include, partially or entirely, a feature that location module 108 may use, as a key, when searching the recorded network activity to identify the portion of network activity that corresponds to auto-update functionality. For example, location module 108 may search recorded network activity for a file having the same hash, or other identifying feature, as the current version of the target application, or another file associated with the current version of the target application. Similarly, location module 108 may search recorded network activity for a file, or attachment, that has the same file version number, or other metadata, as the current version of the target application. In some examples, location module 108 may search for uniform resource locators that contain, partially or entirely, one or more of the identifying attributes described above, or related attributes, such as a chronological date or time (which may be associated with the current version of the target application).

Figure 4:
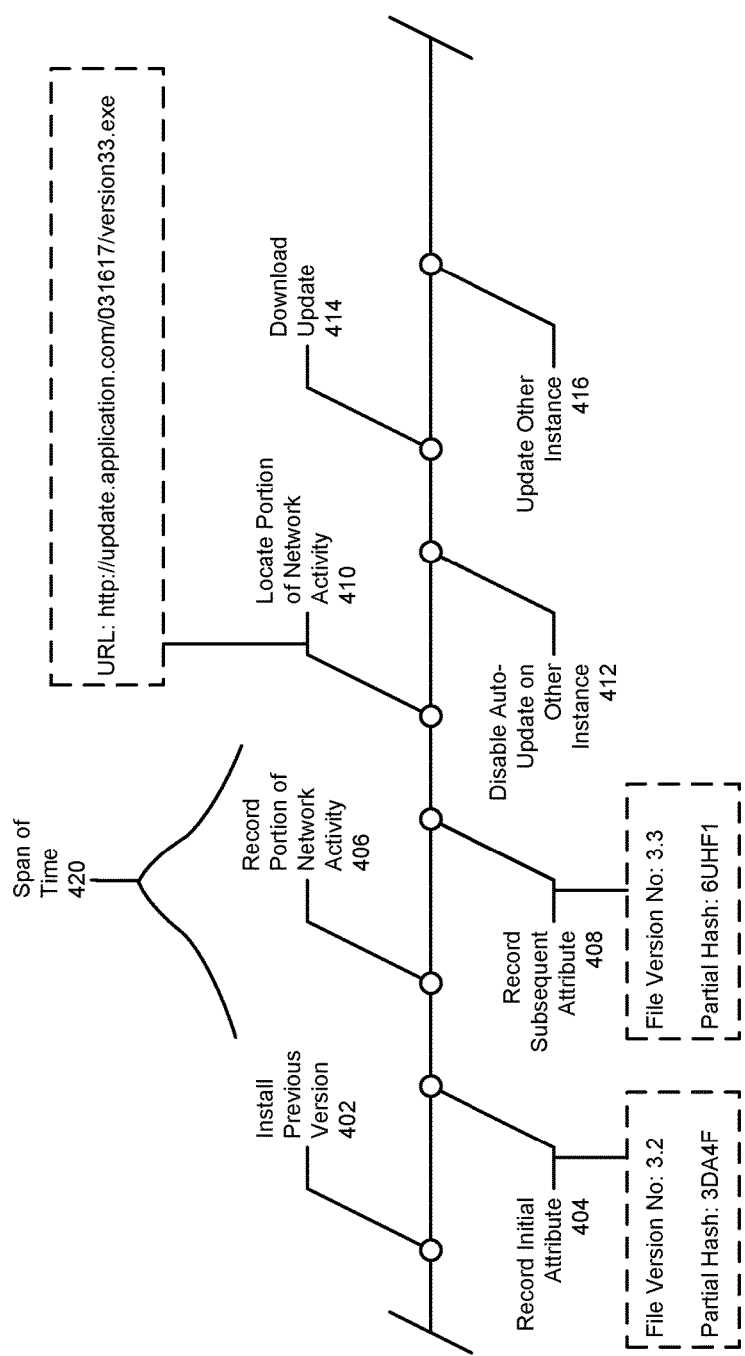
FIG. 4 is a timing diagram that illustrates an operation of an example system for managing application updates.

FIG. 4 shows a timing diagram that illustrates an example of the operation of system 100 and system 200. In this example, at step 402, a previous version, or an initial version, of the target application may be installed at computing device 202. At step 404, recording module 104 may record an initial attribute, which may correspond to a digital fingerprint or file version number, as discussed further above. At step 406, recording module 104 may further record a portion of network activity that is received/transmitted by the target application. In general, recording module 104 may begin recording network activity that is associated with the target application after the installation of the target application at step 402. Recording module 104 may generally monitor, and record, network activity in a continuous manner while the target application is installed.

At step 408, recording module 104 may record a subsequent attribute of the target application at computing device 202, which may correspond to the identifying attribute of step 304, as discussed above. As further shown in this figure, the file version number has switched from "3.2" to "3.3". Similarly, a partial hash of the target application has switched from "3DA4F" to "6UHF1". Accordingly, determination module 106 may determine, in response to step 408 of FIG. 4, that the target application has attempted to perform an update procedure, as further discussed above.

Accordingly, at step 410, location module 108 may locate the portion of network activity that reveals how to manually update the target application. For example, in one embodiment, determination module 106 may determine, within the recorded network activity, the portion of network activity by matching the network activity at step 406, within a span of time 420 shown in FIG. 4, to the recording of the identifying attribute at step 408. Furthermore, in the specific example of FIG. 4, location module 108 may locate a uniform resource locator that provides a source location from which to download the current version of the target application, or a file or patch that updates the target application to the current version.

In general, the portion of the network activity may reveal a uniform resource locator where a download for updating the target application is available. In one embodiment, the uniform resource locator dynamically changes between versions of the target application and the portion of network activity reveals how to dynamically generate the uniform resource locator for the current version of the target application. For example, the uniform resource locator shown in FIG. 4 is dynamically generated based on the date "031617", which may be the date when the current version of the target application was released (or a date that is otherwise associated with the current version of the target application). Additionally, the uniform resource locator is also dynamically generated based on the file version number, which in this case is "3.3". In general, the uniform resource locator may dynamically change between versions of the target application based on a file version of the current version of the target application and/or a date of releasing the target application.

In one embodiment, location module 108 may locate, within the recorded network activity, the portion of network activity at least in part based on detecting that at least one network packet includes a binary attachment according to a network protocol. The network protocol may correspond to the hypertext transfer protocol, or any other suitable network protocol for transmitting binary files or other application update files. The fact that one or more network packets may include an encoded attachment, which may include a binary file, may highlight the network packets as potentially corresponding to target application updating procedures. Additionally or alternatively, location module 108 may attempt to match one or more identifying attributes of the encoded attachment to the identifying attribute recorded at step 408 (and step 304), thereby increasing confidence in the conclusion that the corresponding network activity is the network activity associated with the target application update procedure.

In general, location module 108 may use any permutation of the following one or more factors as indications that one or more network packets are directed to an update procedure for the target application: (i) network packets that correspond to client requests and remote server responses with requested data payloads, (ii) network packets that encode an attachment using the attachment encoding of the network protocol, such as hypertext transfer protocol, (iii) network packet payloads, or attachments, that include binary files or executable files, (iv) network packets that exceed a predetermined size threshold, which may indicate that the network packets are associated with downloading one or more files for updating the target application, and/or (v) multiple responses to the client request for data, thereby indicating that the requested data is sufficiently large to require or involve multiple responses from a remote server (e.g., a download server that maintains the files for updating the target application).

At step 310, one or more of the systems described herein may perform, in response to locating the portion of network activity that reveals how to manually update the instance of the previous version of the target application, a security action to protect a user from a candidate security threat. For example, performance module 110 may, as part of server 206 in FIG. 2, perform, in response to locating portion 230 of network activity that reveals how to manually update an instance of the previous version of target application 260, a security action to protect a user from a candidate security threat.

As used herein, the term "security action" generally refers to any action that an administrator, or corresponding security program (e.g., one or more of modules 102), may perform in an attempt to protect a user from a candidate security threat. Moreover, as used herein, the term "candidate security threat" generally refers to the potential existence of a security threat without necessary confirmation that the security threat is real. In illustrative embodiments, the candidate security threat corresponds to the administrator or security program having not yet tested, evaluated, or approved the current version of the target application.

Performance module 110 may perform the security action in a variety of ways. In illustrative embodiments, performance module 110 may disable the auto-update function of the other instance of the previous version of the target application. As used herein, the term "auto-update function" generally refers to any feature or functionality of the target application that initiates updating of the target application, as distinct from an external application and/or administrator initiating the updating of the target application. In other words, even in cases where the auto-update function displays a prompt that requests user authorization to proceed with the auto-update procedure, the overall procedure is still generally initiated and controlled by the target application itself. In contrast, a manual or other update procedure, outside of the auto-update function, may be initiated and controlled by an endpoint security program, a security server managing an enterprise network environment, and/or administrator of the enterprise network environment, as discussed further below.

Performance module 110 may disable the auto-update function in several ways. In general, performance module 110 may alter a registry setting, target application metadata field value, one or more lines of code of the target application, and/or one or more settings specified in a configuration file that is associated of the target application. Additionally, or alternatively, performance module 110 may simply block one or more network packets that correspond to the auto-update function, as identified at step 410 and step 308, as discussed above. Performance module 110 may block these network packets at the operating system level, at the target application level, and/or at the network level. Performance module 110 may also block all network traffic to and/or from the target application, and/or block all network traffic to and/or from the location (e.g., the uniform resource locator) where the one or more files for updating the target application are located.

In further examples, performance module 110 may simply redirect network traffic from the original download location to an alternative download location that the administrator or enterprise network environment has established. This alternative download location may contain a previous version of the target application (and/or corresponding patch files), which may be the same as the previous version of the target application already installed at computing device 205 or an intervening version between that previous version and the current version, as further discussed above. In this manner, the redirection of the download location may prevent an auto-update function from immediately updating to a current version of the target application until an administrator, or other system or agent, may test and verify the safety of the current version of the target application.

In general, performance module 110 may disable the auto-update function of another instance of the previous version of the target application that has yet to be updated. In the example of FIG. 2, after detecting the updating of the target application at computing device 202, performance module 110 may disable the auto-update function for the previous version of the target application that remains at computing device 205. Both computing device 202 and computing device 205 may correspond to client computing devices within an enterprise network environment, as discussed further above. In some examples, a local security agent (e.g., recording module 104) may be located at a computing device where the initial update is detected through the local security agent (e.g., computing device 202). In contrast, another computing device, such as computing device 205, may not possess the same local security agent. Nevertheless, an outside security system, such as server 206, may nevertheless disable the auto-update procedure for the instance of the previous version of the target application at computing device 205 and/or manually update the instance of the previous version at an alternative time, as discussed above. In this manner, a computing system, such as computing device 205, which does not possess the local security agent, may nevertheless benefit from information that another instance of the local security agent obtained at a different computing device, such as computing device 202.

Additionally, or alternatively, performance module 110 may perform a distinct security action, other than disabling the auto-update function. For example, performance module 110 may notify a user, administrator, or security program or module about the information revealing how to manually update the instance of the previous version of the target application. Performance module 110 may transmit this message by email, text message, pop-up message, a graphical user interface, inter-process communications, and/or any other suitable method of communication. In response, the user, administrator, and/or security program may disable one or more instances of the previous version, download the current version outside of the auto-update function, warn one or more users about the candidate security threat, and/or test or evaluate the current version of the target application. Any one or more of these may correspond to additional security actions.

Additionally, in one embodiment, performance module 110 may further update, after performing the security action, the instance of the previous version of the target application based on the portion of network activity that reveals how to manually update the instance rather than automatically updating the instance of the previous version of the target application through an auto-update function of the instance of the previous version of the target application. In the example of FIG. 4, performance module 110 may disable the auto-update function on the other instance at step 412. Subsequently, performance module 110 may download the update outside of the auto-update procedure at step 414. For example, performance module 110 may download the file "version33.exe" from the uniform resource locator, as discussed above. Additionally, at step 416, performance module 110 may update the other instance of the previous version of the target application at computing device 205 outside of the auto-update procedure, which had previously been disabled.

In general, performance module 110 may disable, and thereafter update outside of the auto-update function, a multitude of instances of the previous version of the target application. Each of these instances may correspond to the remaining instances of the previous version of the target application that remain within the enterprise network environment after one or more initial instances were detected as updating through the auto-update function, in accordance with method 300. Accordingly, method 300 may enable an administrator, or security system, to take control of the updating of most, substantially all, or all target applications in the enterprise network environment, test one or more updates to verify that the updates are secure and non-malicious, and actually perform the updating outside of the auto-update function, in a synchronized manner, that thereby maintains substantially all, or all, of the instances of the target application at the same version over the same period of time.

As discussed above, the disclosed systems and methods may enable an administrator of an enterprise network environment to reliably, and more conveniently, ascertain information revealing how to manually update a target application. In general, this technique may be application-agnostic, in the sense that the technique may reliably ascertain this information for a substantial number, majority, or strong majority of applications in the enterprise network environment, even when these applications correspond to various different vendors. Accordingly, the administrator and/or corresponding endpoint security system may take control of the decision of when to apply a newly-discovered update to one or more additional instances of the application. Additionally, the administrator and/or corresponding endpoint security system may disable the auto-update function on these additional instances of the application, thereby enabling the administrator and/or system to apply the update at a later time (e.g., after the administrator has performed one or more tests or verifications regarding the security of the update). In this manner, the administrator may effectively synchronize the updating of one or more applications across an entire enterprise network. Furthermore, the administrator may switch control of the updating procedure from the application, and its auto-update function, back to the administrator, who may apply one or more updates at a time of the administrator's choosing. Notably, in some examples, the endpoint security system, such as system 100 and system 200 discussed above, may additionally or alternatively perform these functions of the administrator.

Figure 5:
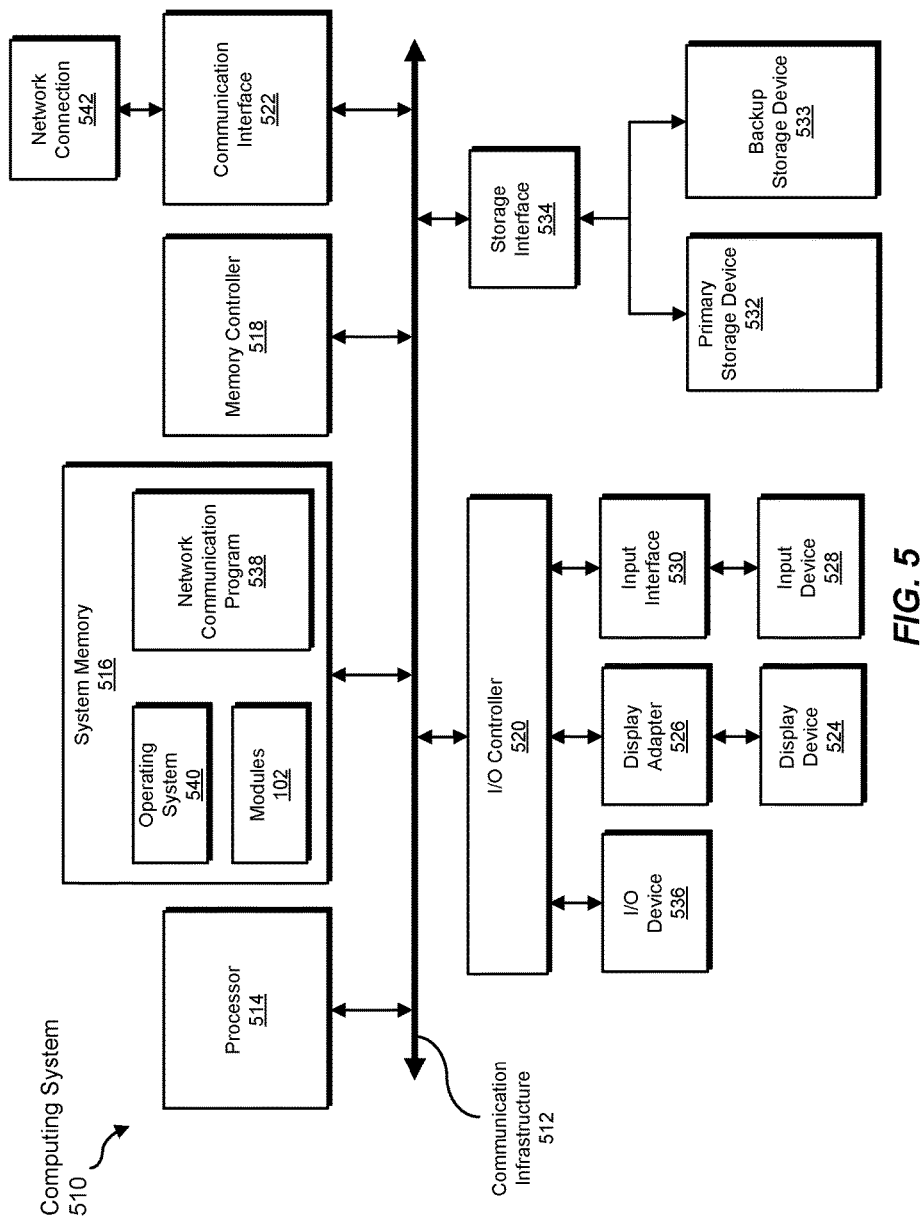
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of physical processing unit (e.g., a hardware-implemented central processing unit) capable of processing data or interpreting and executing instructions. In certain embodiments, processor 514 may receive instructions from a software application or module. These instructions may cause processor 514 to perform the functions of one or more of the example embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In some examples, system memory 516 may store and/or load an operating system 540 for execution by processor 514. In one example, operating system 540 may include and/or represent software that manages computer hardware and software resources and/or provides common services to computer programs and/or applications on computing system 510. Examples of operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

As illustrated in FIG. 5, computing system 510 may also include at least one display device 524 coupled to I/O controller 520 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, example computing system 510 may also include at least one input device 528 coupled to I/O controller 520 via an input interface 530. Input device 528 generally represents any type or form of input device capable of providing input, either computer or human generated, to example computing system 510. Examples of input device 528 include, without limitation, a keyboard, a pointing device, a speech recognition device, variations or combinations of one or more of the same, and/or any other input device.

Additionally or alternatively, example computing system 510 may include additional I/O devices. For example, example computing system 510 may include I/O device 536. In this example, I/O device 536 may include and/or represent a user interface that facilitates human interaction with computing system 510. Examples of I/O device 536 include, without limitation, a computer mouse, a keyboard, a monitor, a printer, a modem, a camera, a scanner, a microphone, a touchscreen device, variations or combinations of one or more of the same, and/or any other I/O device.

Communication interface 522 broadly represents any type or form of communication device or adapter capable of facilitating communication between example computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

In some examples, system memory 516 may store and/or load a network communication program 538 for execution by processor 514. In one example, network communication program 538 may include and/or represent software that enables computing system 510 to establish a network connection 542 with another computing system (not illustrated in FIG. 5) and/or communicate with the other computing system by way of communication interface 522. In this example, network communication program 538 may direct the flow of outgoing traffic that is sent to the other computing system via network connection 542. Additionally or alternatively, network communication program 538 may direct the processing of incoming traffic that is received from the other computing system via network connection 542 in connection with processor 514.

Although not illustrated in this way in FIG. 5, network communication program 538 may alternatively be stored and/or loaded in communication interface 522. For example, network communication program 538 may include and/or represent at least a portion of software and/or firmware that is executed by a processor and/or Application Specific Integrated Circuit (ASIC) incorporated in communication interface 522.

As illustrated in FIG. 5, example computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 510 may be configured as an Application Specific Integrated Circuit (ASIC) adapted to implement one or more of the example embodiments disclosed herein.

Figure 6:
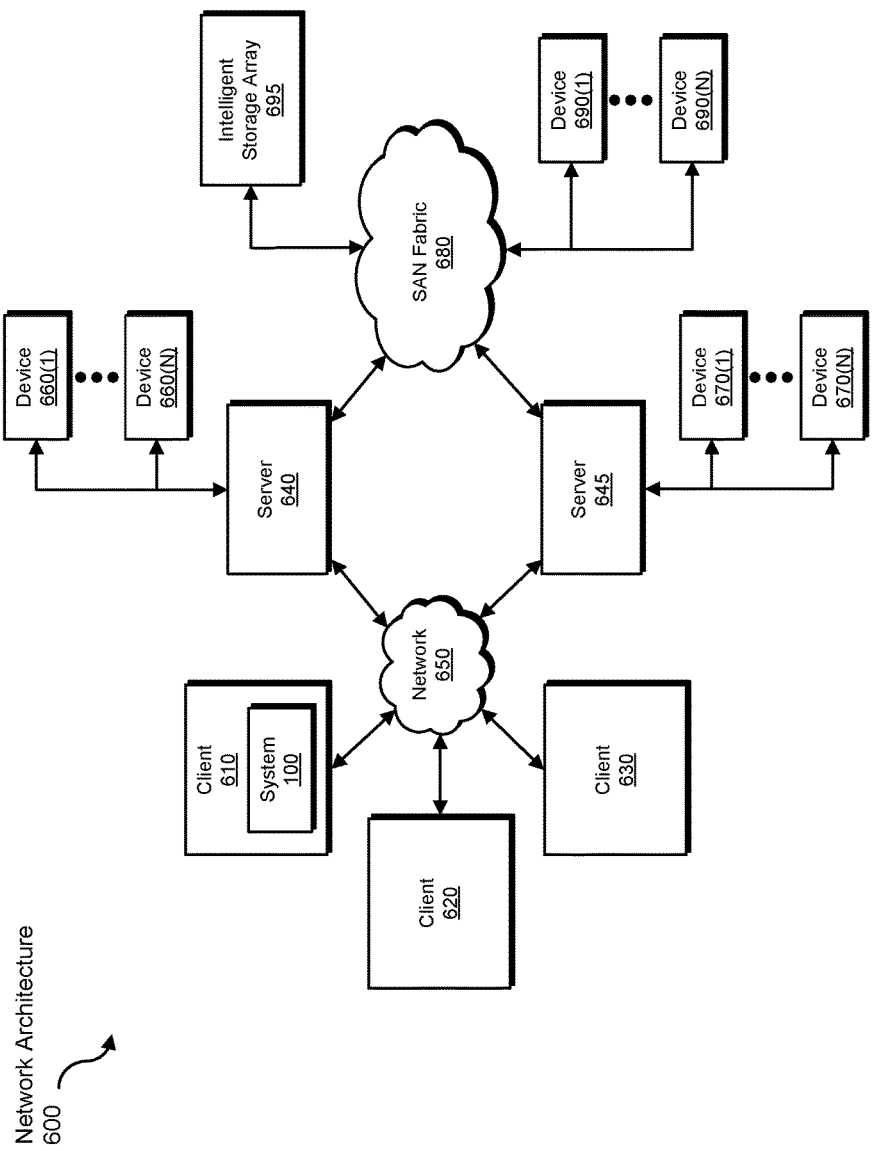
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as example computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to example computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the example embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an example method for managing application updates.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive network data indicating a target application auto-update procedure, transform the data by extracting information that reveals how to manually update the target application and/or modifying the data to disable the auto-update procedure, in accordance with method 300 described above, and/or output a result of the transformation to a network node, display, output device, and/or memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing application updates, at least a portion of the method being performed by a computing device comprising at least one processor, the method comprising:
   recording network activity of a target application;
   recording an identifying attribute of the target application that is associated with a current version of the target application;
   determining, based on recording the identifying attribute that is associated with the current version, that the target application has attempted to update from a previous version of the target application to the current version of the target application;

locating, within the recorded network activity, and in response to determining that the target application has attempted to update from the previous version of the target application to the current version, a portion of network activity that reveals how to manually update an instance of the previous version of the target application; and performing, in response to locating the portion of network activity that reveals how to manually update the instance of the previous version of the target application, a security action to protect a user from a candidate security threat, wherein:

the portion of the network activity reveals a uniform resource locator where a download for updating the target application is available; and the uniform resource locator dynamically changes between versions of the target application and the portion of network activity reveals how to dynamically generate the uniform resource locator for the current version of the target application.

2. The computer-implemented method of claim 1, further comprising updating, after performing the security action, the instance of the previous version of the target application based on the portion of network activity that reveals how to manually update the instance rather than automatically updating the instance of the previous version of the target application through an auto-update function of the instance of the previous version of the target application.

3. The computer-implemented method of claim 1, wherein the uniform resource locator dynamically changes between versions of the target application based on a file version of the current version of the target application.

4. The computer-implemented method of claim 1, wherein the uniform resource locator dynamically changes between versions of the target application based on a date of releasing the target application.

5. The computer-implemented method of claim 1, wherein the uniform resource locator dynamically changes between versions of the target application based on both:
a file version of the current version of the target application; and
a date of releasing the target application.

6. The computer-implemented method of claim 1, wherein the identifying attribute that is associated with the current version comprises a file version number.

7. The computer-implemented method of claim 1, wherein the identifying attribute that is associated with the current version comprises a hash of the current version of the target application.

8. The computer-implemented method of claim 1, wherein determining that the target application has attempted to update from the previous version of the target application to the current version of the target application comprises determining that the identifying attribute has changed from a previous version of the identifying attribute.

9. The computer-implemented method of claim 1, wherein locating, within the recorded network activity, the portion of network activity comprises matching the network activity, within a span of time, to the recording of the identifying attribute.

10. The computer-implemented method of claim 1, wherein the security action comprises disabling an auto-update function of the instance of the previous version of the target application.

11. A system for managing application updates, the system comprising:
a recording module, stored in memory, that:
records network activity of a target application; and
records an identifying attribute of the target application that is associated with a current version of the target application;
a determination module, stored in memory, that determines, based on recording the identifying attribute that is associated with the current version, that the target application has attempted to update from a previous version of the target application to the current version of the target application;
a location module, stored in memory, that locates, within the recorded network activity, and in response to determining that the target application has attempted to update from the previous version of the target application to the current version, a portion of network activity that reveals how to manually update an instance of the previous version of the target application;
a performance module, stored in memory, that performs, in response to locating the portion of network activity that reveals how to manually update the instance of the previous version of the target application, a security action to protect a user from a candidate security threat; and
at least one physical processor configured to execute the recording module, the determination module, the location module, and the performance module, wherein:
the portion of the network activity reveals a uniform resource locator where a download for updating the target application is available; and
the uniform resource locator dynamically changes between versions of the target application and the portion of network activity reveals how to dynamically generate the uniform resource locator for the current version of the target application.

12. The system of claim 11, wherein the performance module is further configured to update, after performing the security action, the instance of the previous version of the target application based on the portion of network activity that reveals how to manually update the instance rather than automatically updating the instance of the previous version of the target application through an auto-update function of the instance of the previous version of the target application.

13. The system of claim 11, wherein the uniform resource locator dynamically changes between versions of the target application based on a file version of the current version of the target application.

14. The system of claim 11, wherein the uniform resource locator dynamically changes between versions of the target application based on a date of releasing the target application.

15. The system of claim 11, wherein the uniform resource locator dynamically changes between versions of the target application based on both:
a file version of the current version of the target application; and
a date of releasing the target application.

16. The system of claim 11, wherein the identifying attribute that is associated with the current version comprises a file version number.

17. The system of claim 11, wherein the identifying attribute that is associated with the current version comprises a hash of the current version of the target application.

18. The system of claim 11, wherein the determination module is configured to determine that the target application has attempted to update from the previous version of the target application to the current version of the target application at least in part by determining that the identifying attribute has changed from a previous version of the identifying attribute.

19. The system of claim 11, wherein the location module locates, within the recorded network activity, the portion of network activity by matching the network activity, within a span of time, to the recording of the identifying attribute.

20. A non-transitory computer-readable medium comprising one or more computer-readable instructions that, when executed by at least one processor of a computing device, cause the computing device to:
   record network activity of a target application;
   record an identifying attribute of the target application that is associated with a current version of the target application;
   determine, based on recording the identifying attribute that is associated with the current version, that the target application has attempted to update from a previous version of the target application to the current version of the target application;
   locate, within the recorded network activity, and in response to determining that the target application has attempted to update from the previous version of the target application to the current version, a portion of network activity that reveals how to manually update an instance of the previous version of the target application; and
   perform, in response to locating the portion of network activity that reveals how to manually update the instance of the previous version of the target application, a security action to protect a user from a candidate security threat, wherein:
   the portion of the network activity reveals a uniform resource locator where a download for updating the target application is available; and
   the uniform resource locator dynamically changes between versions of the target application and the portion of network activity reveals how to dynamically generate the uniform resource locator for the current version of the target application.

\* \* \* \* \*